(12) United States Patent
Dunn et al.

(10) Patent No.: US 7,938,077 B1
(45) Date of Patent: May 10, 2011

(54) HYDROGEN GENERATION APPARATUS FOR AN UNDERWATER VEHICLE

(75) Inventors: Paul M. Dunn, Wakefield, RI (US); Gerald K. Pitcher, Charlestown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/070,131

(22) Filed: May 27, 1993

(51) Int. Cl.
*F42B 19/12* (2006.01)
*B63G 8/08* (2006.01)

(52) U.S. Cl. .......................... 114/337; 114/20.2; 440/44

(58) Field of Classification Search ............... 114/20.2, 114/337, 338; 440/113, 44; 60/668, 652
See application file for complete search history.

(56) References Cited

U.S. PATENT DOCUMENTS

| | | | | |
|---|---|---|---|---|
| 3,101,592 A * | 8/1963 | Robertson et al. | ............ | 114/337 |
| 3,964,416 A * | 6/1976 | Kiraly et al. | ................ | 114/20.2 |
| 4,680,934 A * | 7/1987 | Short | ........................... | 114/20.2 |
| 4,698,974 A * | 10/1987 | Wood | ............................. | 60/668 |
| 5,117,635 A * | 6/1992 | Blau | ............................. | 60/668 |

* cited by examiner

*Primary Examiner* — Timothy D Collins
*Assistant Examiner* — Joseph W Sanderson
(74) *Attorney, Agent, or Firm* — James M. Kasischke; Michael P. Stanley; Jean-Paul A. Nasser

(57) ABSTRACT

A hydrogen generation apparatus for an underwater vehicle is presented, the apparatus including a hydrolysis reaction compartment, a mass of solid lithium hydride disposed in the compartment, inlet and outlet structure for passing sea water through the compartment to generate steam, lithium hydroxide and hydrogen gas, a condenser for condensing out the steam and retaining the condensate and lithium hydroxide, and a tank for collecting the hydrogen gas, the tank having outlet structure for discharging the hydrogen gas to a vehicle propulsion system.

22 Claims, 2 Drawing Sheets

US 7,938,077 B1

HYDROGEN GENERATION APPARATUS FOR AN UNDERWATER VEHICLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The invention relates to the provision of propulsion power for underwater vehicles, and is directed more particularly to a hydrogen gas generating apparatus which utilizes seawater to generate the hydrogen gas.

(2) Description of the Prior Art

It is known to provide unmanned underwater vehicles (UUV) which are adapted to be launched from submarine torpedo tubes and recovered through the submarine torpedo tube. After recovery, the UUV may be refueled and/or recharged and launched again. Secondary batteries with an electric motor for propulsion meet these requirements but are notably limited in endurance.

Many missions would be available to UUVs if the endurance of such vehicles were substantially longer. It would also be beneficial if in conjunction with improved endurance, the UUV were adapted to run more quietly.

Fuel cells offer several fold improvements over batteries relative to endurance. Of the fuel cells available, the proton exchange membrane (PEM) has been found the most suitable for the undersea requirements of a UUV. However, the PEM fuel cells require both hydrogen and oxygen fuel sources. Hydrogen and oxygen can be stored onboard the UUV as high-pressure compressed gases, but the resulting endurance is only slightly better than with batteries. Further, high-pressure compressed gases are not welcome onboard a submarine. Hydrogen and oxygen may be stored as cryogenic liquids and result in an improvement in endurance of two to three times better than with batteries. However, cryogenic liquids are not welcome onboard submarines. Compressed or cryogenic oxygen is not currently allowed on submarines, nor is compressed or cryogenic hydrogen. While the situation may, in due course, change with respect to oxygen, it is unlikely that there will be a change relative to hydrogen. Hydrogen may be stored by the hydrogenation of metal hydrides, sometimes referred to as "hydrogen sponges", that release the hydrogen upon addition of heat. While hydrogen sponges might be accepted onboard submarines, the improvement in endurance over batteries is marginal.

Accordingly, there exists a need for a hydrogen gas generating apparatus which is acceptable onboard submarines, can provide sufficient hydrogen gas to PEM driven propulsion systems to afford endurance greatly improved over batteries, and provides means for facilitating quieter operation of the UUV.

SUMMARY OF THE INVENTION

It is, therefore, an object of the invention to provide a hydrogen gas generation apparatus for an underwater vehicle, the apparatus providing sufficient hydrogen gas to increase the endurance of the vehicle severalfold over that provided by batteries.

A further object of the invention is to provide such an apparatus as is acceptable for storage onboard submarines.

A further object of the invention is to provide such an apparatus having facility for enabling quieter operation of the vehicle.

A still further object of the invention is to provide such an apparatus which utilizes sea water as a hydrogen gas generating component and as a coolant operating at or below the boiling point of the water.

With the above and other objects in view, as will otherwise hereinafter appear, a feature of the present invention is the provision of a hydrogen gas generation apparatus for an underwater vehicle, the apparatus comprising a hydrolysis reaction compartment, a mass of solid lithium hydride disposed in the compartment, inlet and outlet means for passing sea water through the compartment to generate steam, lithium hydroxide and hydrogen gas, a condenser for condensing the steam and lithium hydroxide, and a tank for collecting the hydrogen gas, the tank having outlet means for discharging the hydrogen gas to a vehicle propulsion means.

The above and other features of the invention, including various novel details of construction and combinations of parts, will now be more particularly described with reference to the accompanying drawings and pointed out in the claims. It will be understood that the particular apparatus embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
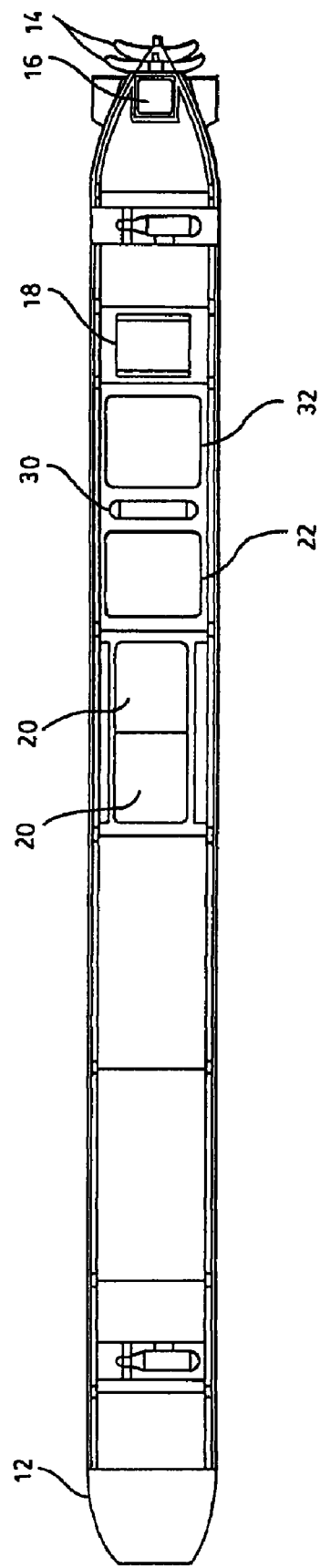
FIG. 1 is a diagrammatic representation of an underwater vehicle having onboard a hydrogen generation apparatus for providing hydrogen gas to a vehicle propulsion system.

Referring to FIG. 1, there is shown diagrammatically a propulsion system for an unmanned underwater vehicle (UUV) 12. The vehicle is driven by a propulsion system including propellers 14 turned by an electric motor 16. The motor 16 is, in turn, powered by a proton exchange membrane (PEM) fuel cell 18, as is known in the art. The fuel cell 18 operates to consume oxygen and hydrogen and convert same to the electricity required to operate the motor 16.

The oxygen required to fuel the PEM fuel cell is stored in solid form, in chlorates and/or perclorates, in a stable manner. Oxygen is released by thermal decomposition, or by burning. Hence, such oxygen sources are sometimes referred to as "oxygen candles". Storing oxygen in this manner is acceptable onboard submarines. The use of oxygen candles 20 to provide oxygen to PEM fuel cells is known in the art and will not be discussed further herein.

The hydrogen required to fuel the PEM fuel cell is, in accordance with the present invention, stored in solid form. The hydrogen is stored in a stable manner within a metal hydride which is water reactive. The process of releasing hydrogen by reaction of metal hydrides with water is referred to as hydrolysis and is known in the art. Storing of both hydrogen and oxygen in solid form offers a marked improvement in endurance over batteries by several fold and provides stability acceptable onboard submarines.

Figure 2:
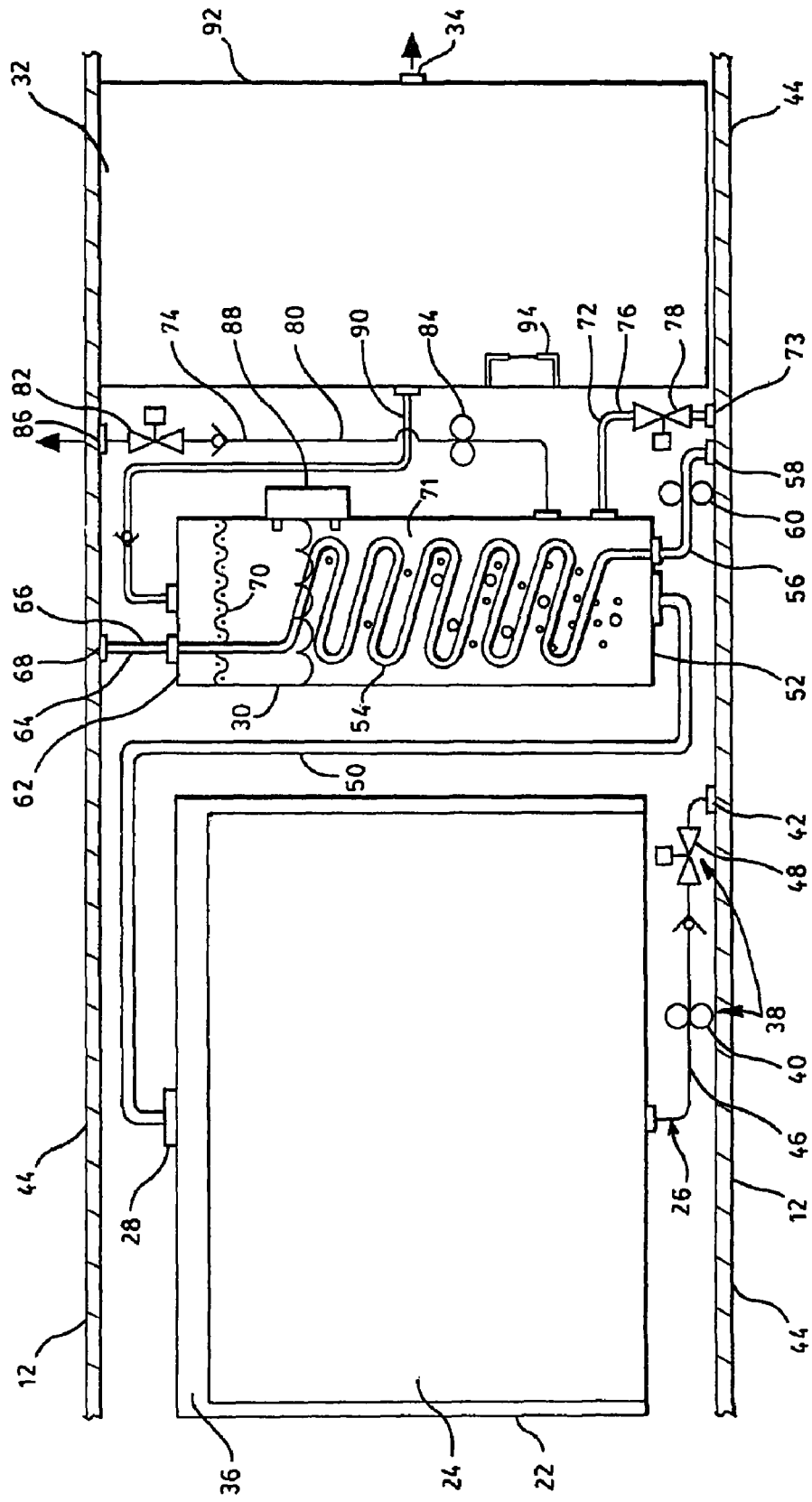
FIG. 2 is a diagrammatic representation of a hydrogen generation apparatus illustrative of an embodiment of the invention.

Accordingly, the vehicle shown in FIG. 1 is provided with a hydrogen generation apparatus including a hydrolysis reaction compartment 22 and a mass of pressed or cast solid lithium hydride (LiH) 24 disposed in the compartment (FIG. 2). As may be seen in FIG. 2, reaction compartment 22 is provided with inlet and outlet means, 26, 28, respectively, for passing sea water from outside the vehicle through reaction compartment 22 to generate hydrolysis products, namely, steam, lithium hydroxide (LiOH), and hydrogen gas ($H_2$). The above term "steam" is intended to include a two-phase liquid and vapor mixture. The apparatus further includes a condenser 30 for condensing the steam and lithium hydroxide generated in the reaction compartment. The apparatus still further includes a tank 32 for collecting hydrogen gas generated in reaction compartment 22 and passed through condenser 30. The tank 32 is provided with an outlet 34 for discharging the hydrogen gas to PEM fuel cell 18 of the vehicle propulsion system.

Hydrolysis reaction compartment 22 is provided with a chamber 36 for temporary accumulation of the hydrolysis products. Means 38 for activating reaction compartment inlet means 26 includes a feed pump 40, a sea water feed 42 in a wall 44 of vehicle 12, a sea water feed line 46 extending to reaction compartment 22, and a motor operated valve 48.

Condenser 30 is provided, at a first end 52 thereof, with a conduit 50 extending from reaction compartment outlet means 28 and adapted to convey the hydrolysis products, that is, the steam, lithium hydroxide in droplets of water, and hydrogen gas, from the accumulator chamber 36 of reaction compartment 22 to first end 52 of condenser 30. Condenser 30 is provided with a condenser coil 54. Condenser coil 54 includes a condenser coil inlet 56 comprising an extension of the condenser coil and extending through first end 52 of the condenser and to a condenser cooling water inlet 58 in the wall 44 of the vehicle. A condenser cooling water pump 60 is provided for drawing water from outside the vehicle 12 through inlet 58 and forcing the water into the condenser coil inlet 56, at high rates of hydrogen generation. For quiet operation at low rates of hydrogen generation, the condenser may be cooled by "thermo-siphoning" without the pump 60 operating.

Condenser 30 further is provided, at a second end 62 thereof, with a condenser coil outlet 64 comprising an extension 66 of the condenser coil 54 and extending through second end 62 of condenser 30 and to a condenser cooling water outlet 68 in wall 44 of vehicle 12. A droplet screen 70 is disposed in condenser 30 proximate to, but removed from, second end 62 of the condenser. Droplet screen 70 permits hydrogen gas to pass therethrough, but acts to retard sloshing of liquid therethrough. The condenser is adapted to retain waste water 71 therein at the first end 52 thereof and extending proximate to, but removed from, droplet screen 70. The water 71 acts to condense the steam and lithium hydroxide, while the hydrogen gas bubbles therethrough and passes through the droplet screen. The water in the condenser substantially covers condenser coil 54.

Condenser 30 is still further provided with a water inlet means 72 for admitting sea water to the condenser, and waste water outlet means 74 for discharging waste water from the condenser to the exterior of the vehicle. The water inlet means 72 includes a water inlet conduit 76 extending from the vehicle wall 44 to condenser 30, and a motor driven water inlet valve 78 in conduit 76, such that upon activation of the inlet valve 78, sea water is admitted through a water inlet 73 to the condenser to fill the condenser on start-up.

Waste water outlet means 74 includes a waste water outlet conduit 80 extending from condenser 30 to vehicle wall 44, a motor driven waste water outlet valve 82 in conduit 80, and a waste water outlet pump 84 in conduit 80, such that upon activation of outlet valve 82 and outlet pump 84, the waste water in condenser 30 is discharged through a waste water outlet 86 to the exterior of the vehicle.

A level control means 88 is disposed in the condenser and is operative to maintain a proper level of waste water in condenser 30. When the level rises to its maximum desired level, level control means 88 is operative to activate waste water outlet valve 82 and waste water outlet pump 84 to discharge waste water from the condenser to lower the level of the waste water.

A hydrogen supply line 90 interconnects condenser second end 62 and a buffer tank 92 and conveys the hydrogen gas passed through condenser 30 to the buffer tank which is adapted to store accumulated hydrogen gas. The buffer tank feeds hydrogen gas to the PEM fuel cell which converts the hydrogen gas and the aforementioned oxygen into electrical power for energizing electric motor 16 for driving propellers 14.

Tank 92 is provided with a pressure sensor 94 which is adapted, upon detection of pressure approaching too low to support fuel cell operation, to activate the reaction compartment inlet means 26 to initiate further production of hydrogen gas, thereby to increase the hydrogen gas pressure in tank 92.

In operation, the vehicle 12 is stored onboard a submarine. The hydrogen generation apparatus is free of water and, other than the reaction compartment 22, is charged with an inert gas, such as argon. Thus, after launch, condenser 30 must be sufficiently filled with water to cover the condenser coils 54. To accomplish filling of the condenser, motor operated water inlet valve 78 is opened to permit the sea depth pressure to fill condenser 30 until the level control means closes the inlet valve. Thus, initially, the water in the condenser is sea water, rather than waste water. However, as the hydrogen generation process progresses, the reservoir of water in the condenser becomes substantially a mixture of condensed steam, lithium hydroxide and sea water.

To start the generation of hydrogen, motor operated valve 48 is opened and feed pump 40 is started. Sea water is pumped to the reaction compartment 22 and contacts the solid lithium hydride, to produce hydrogen, steam, and droplets of water near-saturated with lithium hydroxide. The three hydrolysis products accumulate in reaction compartment chamber 36 and pass through conduit 50 to condenser 30. The steam carries away the heat of reaction. The droplets carry away the lithium hydroxide.

The hydrogen, steam, and lithium hydroxide droplets enter condenser 30 at first end 52. The steam bubbles into the condenser and is condensed. The droplets are retained in the condenser. The aggregate of start-up sea water, condensed steam, and droplets rich in lithium hydroxide is referred to as product waste water 71. The hydrogen bubbles through the waste water 71 and passes to second end 62 of the condenser.

The addition of condensed steam and droplets causes the waste water level in the condenser to rise. The level control means 88 senses when the waste water level is at the high limit and turns on waste water outlet pump 84. Waste water is pumped overboard until the level control means senses the waste water has reached the lower level at which time the level control means turns off water outlet pump 84 and closes valve 82.

The hydrogen at the second end 62 of the condenser passes through droplet screen 70, which is fine-pored and adapted to retain sloshing waste water and particulate matter in the condenser.

Coolant for condenser 30 is drawn from the sea. Condenser cooling water inlet pump 60 moves condenser cooling water through condenser coil 54. The condenser cooling water flow is required to maintain the temperature of the waste water at 80°-90° C. The hydrogen leaves the condenser 30 and passes to buffer tank 92. The buffer tank operates to accumulate hydrogen gas and provide a ready quantity of hydrogen for the Proton Exchange Membrane (PEM) fuel cell. A ready reservoir of hydrogen gas affords time for reaction compartment 22 to respond to changes in fuel cell power levels. Typically, it requires a few minutes for the generation of hydrogen to come to full rate from shut-off. The reservoir of hydrogen gas also permits quiet operation at low power levels. The hydrogen generation operation is periodic, with pumps and motors being turned on and off. Storing a sizable quantity of hydrogen permits quiet operation at low power levels for hours. Tank 92 further serves as a buoyancy tank, ensuring that the vessel is neutrally buoyant and able to loiter underwater. The pressure sensor 94 in the tank 92 senses when the hydrogen pressure falls close to PEM fuel cell minimum pressure requirements. When the pressure is low, sea water is pumped to the reaction compartment 22 to restart hydrogen production.

During operation of the system described herein, to effect hydrolysis, a passivating film of lithium hydroxide (LiOH) forms on the solid in accordance with the reaction: $LiH + H_2O = LiOH + H_2 + 3975$ cal/g (LiH). The LiOH film provides a means for reaction control. Near linear control of hydrogen generation rate is achieved as a function of water flow. When the water flow to the reaction compartment 22 is shut off, the film forms, isolating the unreacted LiH from the water-dissolved LiOH mixture. When the water flow is turned on, or increased, the film dissolves into the water, causing the LiH to hydrolyze. The rate of film dissolution is believed to be nearly linear with the water flow rate, providing for control of the LiH hydrolysis reaction. The film further allows for use of excess water, causing the reaction to occur at or below boiling temperature, simplifying hardware requirements. The excess water is further useful to remove the sizable heat of reaction, 3975 cal/g (LiH), and transport the heat of reaction from the site as steam.

Thus, there is provided a hydrogen generation apparatus suitable for underwater vehicles. The apparatus affords greatly increased endurance for such vehicles, is safe for storage onboard submarines, enables quiet operation for long periods of time at low power levels, and utilizes the surrounding sea water in its operation.

It will be understood that the present invention is by no means limited to the particular construction herein disclosed and/or shown in the drawings, but also comprises any modifications or equivalents within the scope of the claims. While the apparatus has been described in terms of a component for an underwater vehicle propulsion system, and is particularly well-suited for such use in view of the requirement for a supply of water, it will be apparent that the same system is readily adaptable to dry land operations, provided a ready source of water is made available.

What is claimed is:

1. A hydrogen generation apparatus for an underwater vehicle, said apparatus comprising:
   a hydrolysis reaction compartment;
   a mass of solid lithium hydride disposed in said compartment;
   inlet and outlet means for passing sea water through said compartment to generate steam, lithium hydroxide and hydrogen gas;
   a condenser for condensing said steam and retaining the steam condensate and said lithium hydroxide, and
   a tank for collecting said hydrogen gas, said tank having outlet means for discharging said hydrogen gas to a vehicle propulsion means.

2. The apparatus in accordance with claim 1, and:
   means for ingesting seawater into the inlet means at a rate in excess of the maximum rate at which the water can be reacted with the lithium hydride; and
   whereby the excess water acts as a coolant and the reaction is at least approximately linearly controllable.

3. A hydrogen generation apparatus for an underwater vehicle, said apparatus comprising:
   a hydrolysis reaction compartment having an inlet means for admission of sea water thereinto, said reaction compartment further having an outlet for discharge of hydrolysis products;
   a chamber between said inlet and said outlet for accumulation of said hydrolysis products temporarily;
   a mass of solid lithium hydride disposed in said compartment between said inlet and said chamber;
   means for activating said inlet to admit seawater to said compartment to contact said lithium hydride and activate hydrolysis;
   a condenser in communication with said outlet and adapted to condense steam in a reservoir of water, retain lithium hydroxide in said reservoir of water, and to permit passage therethrough of hydrogen gas, and
   a buoyancy buffer tank in communication with said condenser, and adapted to receive said hydrogen gas from said condenser, said buffer tank having outlet means for discharging said hydrogen gas to a vehicle propulsion means.

4. The apparatus in accordance with claim 3 wherein said hydrolysis reaction compartment inlet means includes a feed pump.

5. The apparatus in accordance with claim 4 wherein said hydrolysis reaction compartment inlet means comprises a seawater feed in a wall of said vehicle, a seawater feed line extending to said compartment, a motor operated valve in said feed line, and said feed pump disposed in said feed line.

6. The apparatus in accordance with claim 4 wherein said hydrolysis products accumulated in said chamber include said steam, said lithium hydroxide in droplets of water, and hydrogen gas.

7. The apparatus in accordance with claim 6 with said condenser having at a first end thereof a conduit extending from said reaction compartment outlet, said conduit being adapted to convey said hydrolysis products accumulated in said chamber to said first end of said condenser.

8. The apparatus in accordance with claim 7 and including a condenser coil in said condenser.

9. The apparatus in accordance with claim 8 and including a condenser coil inlet conduit comprising an extension of said condenser coil and extending through said first end of said condenser and to a condenser cooling water inlet in a wall of said-vehicle.

10. The apparatus in accordance with claim 9 and further including a condenser cooling water pump in said condenser cooling water inlet conduit.

11. The apparatus in accordance with claim 10 and including a condenser coil outlet conduit comprising an extension of said condenser coil and extending through a second end of said condenser and to a condenser cooling water outlet in said wall of said vehicle.

12. The apparatus in accordance with claim 11 including a droplet screen in said condenser and proximate to, but removed from, said second end of said condenser, said screen being adapted to permit said hydrogen to pass therethrough.

13. The apparatus in accordance with claim 12 wherein said condenser is adapted to retain waste water therein at said first end of said condenser and extending proximate to, but removed from, said screen, wherein said steam is condensed by said waste water, wherein said lithium hydroxide is retained in said waste water and wherein said hydrogen passes through said waste water to said screen.

14. The apparatus in accordance with claim 13 and further including water inlet means for admitting seawater to said condenser, and waste water outlet means for discharging said waste water from said condenser to the exterior of said vehicle.

15. The apparatus in accordance with claim 14 wherein said water inlet means comprises a water inlet conduit extending from said wall of said vehicle to said condenser, and a motor driven water inlet valve in said water inlet conduit, whereby upon activation of said water inlet valve, sea water is admitted to said condenser.

16. The apparatus in accordance with claim 15 wherein said waste water outlet means comprises a waste water outlet conduit extending from said condenser to said vehicle wall, a motor driven waste water outlet valve in said waste water outlet conduit, and a waste water outlet pump in said waste water outlet conduit, whereby upon activation of said waste water outlet valve and pump said waste water in said condenser is discharged through said waste water outlet to the exterior of said vehicle.

17. The apparatus in accordance with claim 16, including a level control means in said condenser and adapted to maintain the level of said waste water between selected distances from said condenser ends.

18. The apparatus in accordance with claim 17 wherein said level control means is adapted to activate said waste water outlet valve and said waste water outlet pump to discharge said waste water from said condenser to shorten the distance between the surface of said waste water and said condenser first end.

19. The apparatus in accordance with claim 18 wherein said level control means is adapted to activate said reaction compartment feed line valve and said reaction compartment feed pump to initiate flow of sea water into said reaction compartment to increase the flow of said hydrolysis products into said condenser to increase the distance between the surface of said waste water and said condenser first end.

20. The apparatus in accordance with claim 19 and including a hydrogen supply line interconnecting said condenser second end and said buffer tank, said hydrogen supply line being adapted to convey said hydrogen gas passed through said condenser to said buffer tank.

21. The apparatus in accordance with claim 20 and including a hydrogen pressure sensor in said buffer tank, said pressure sensor being operative to activate said reaction compartment feed line valve and said reaction compartment feed pump to initiate production of hydrogen gas and thereby increase the pressure in said buffer tank.

22. The apparatus in accordance with claim 3, and:
means for ingesting seawater into the inlet means at a rate in excess of the maximum rate at which the water can be reacted with the lithium hydride; and
whereby the excess water acts as a coolant and the reaction is at least approximately linearly controllable.

* * * * *